United States Patent
Kim et al.

(10) Patent No.: US 12,549,933 B2
(45) Date of Patent: Feb. 10, 2026

(54) METHOD AND APPARATUS FOR SIGNALLING IN MOBILE ACCESS NETWORK USING SERVICE-BASED INTERFACE

(71) Applicant: ELECTRONICS AND TELECOMMUNICATIONS RESEARCH INSTITUTE, Daejeon (KR)

(72) Inventors: Changki Kim, Daejeon (KR); Yoo Hwa Kang, Daejeon (KR); Namseok Ko, Daejeon (KR); No Ik Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 619 days.

(21) Appl. No.: 18/070,545

(22) Filed: Nov. 29, 2022

(65) Prior Publication Data
US 2023/0171582 A1   Jun. 1, 2023

(30) Foreign Application Priority Data

Nov. 29, 2021  (KR) ................. 10-2021-0167043
Nov. 28, 2022  (KR) ................. 10-2022-0161661

(51) Int. Cl.
*H04W 8/02* (2009.01)
*H04W 28/02* (2009.01)
(Continued)

(52) U.S. Cl.
CPC ......... *H04W 8/02* (2013.01); *H04W 28/0268* (2013.01); *H04W 72/21* (2023.01); *H04W 72/23* (2023.01); *H04W 76/10* (2018.02)

(58) Field of Classification Search
None
See application file for complete search history.

(56) References Cited

U.S. PATENT DOCUMENTS 12,212,527 B2 * 1/2025 Taherzadeh Boroujeni ............... H04L 5/0007
2019/0053010 A1  2/2019 Edge et al.
(Continued)

FOREIGN PATENT DOCUMENTS

KR  10-2020-0024363 A   3/2020
KR  10-2020-0098562 A   8/2020
(Continued)

OTHER PUBLICATIONS

3rd Generation Partnership Project; Technical Specification Group Services and System Aspects; System architecture for the 5G System (5GS); Stage 2 (Release 16), 3GPP TS 38.401 V16.7.0 (Oct. 2021).

(Continued)

*Primary Examiner* — Christopher T Wyllie
(74) *Attorney, Agent, or Firm* — LRK PATENT LAW FIRM

(57) ABSTRACT

A method and a network function of an access network for supporting an initial access of UE through the steps of: receiving a request for a first service operation for initial context setup from an AMF of a core network through an interface of service-based architecture between the AMF and the network function; and establishing a bearer related to a user plane function in the access network based on information included in the first service operation are provided.

16 Claims, 4 Drawing Sheets

(51) Int. Cl.
  *H04W 72/21*   (2023.01)
  *H04W 72/23*   (2023.01)
  *H04W 76/10*   (2018.01)

(56) References Cited

U.S. PATENT DOCUMENTS

| | | | |
|---|---|---|---|
| 2019/0166646 A1* | 5/2019 | Shih | H04W 72/04 |
| 2019/0246378 A1* | 8/2019 | Islam | H04L 1/1819 |
| 2019/0372929 A1 | 12/2019 | Yang et al. | |
| 2020/0322821 A1 | 10/2020 | Lee et al. | |
| 2020/0344274 A1 | 10/2020 | Jahangir et al. | |
| 2021/0342803 A1 | 11/2021 | Yoo | |
| 2022/0232452 A1* | 7/2022 | Sivaraj | H04W 8/26 |
| 2022/0240131 A1* | 7/2022 | Yang | H04W 28/0252 |
| 2023/0156650 A1* | 5/2023 | Salkintzis | H04W 60/00 |
| | | | 455/435.1 |
| 2023/0171582 A1* | 6/2023 | Kim | H04W 72/23 |
| | | | 370/329 |
| 2024/0298253 A1* | 9/2024 | Talebi Fard | H04W 48/18 |

FOREIGN PATENT DOCUMENTS

| | | | |
|---|---|---|---|
| WO | 2019/031901 A1 | 2/2019 | |
| WO | 2019/139345 A1 | 7/2019 | |
| WO | WO-2022058027 A1 * | 3/2022 | H04L 67/51 |

OTHER PUBLICATIONS

3rd Generation Partnership Project; Technical Specification Group Radio Access Network; NG-RAN; Architecture description (Release 17), 3GPP TS 23.501 V17.1.1 (Jun. 2021).

* cited by examiner

METHOD AND APPARATUS FOR SIGNALLING IN MOBILE ACCESS NETWORK USING SERVICE-BASED INTERFACE

CROSS-REFERENCE TO RELATED APPLICATIONS

This application claims priority to and the benefit of Korean Patent Application No. 10-2021-0167043 filed in the Korean Intellectual Property Office on Nov. 29, 2021, and Korean Patent Application No. 10-2022-0161661 filed in the Korean Intellectual Property Office on Nov. 28, 2022, the entire contents of which are incorporated herein by reference.

BACKGROUND

1. Field of the Invention

The present disclosure relates to a method and apparatus for supporting signaling in a mobile access network to which a service-based interface is applied.

2. Description of Related Art

One of the innovative changes of a 5G system is the service-based architecture (SBA). A web-based technology is applied to the 5G system for the first time in order to overcome the problems of a peer-to-peer (P2P) architecture that has been used for a long time in the previous generation mobile systems.

Compared to the P2P, the SBA is more efficient in modularization and slice application and has the merit of reducing CAPEX (Capital expenditures) and OPEX (Operating Expenditure) when new services are added. Therefore, the SBA is suitable for virtualization and cloud platforms in an environment where network functions (NFs) are implemented by software.

SUMMARY

Embodiments provide a network function in an access network.

Embodiments provide a method for supporting an access of user equipment (UE) by a network function.

According to an embodiment, a network function in an access network is provided. The network function includes a processor and memory, wherein the processor executes a program stored in the memory to perform: receiving a request for a first service operation for initial context setup from an access and mobility management function (AMF) of a core network through a first interface of a service-based architecture between the AMF and the network function; and establishing a bearer associated with a user plane function within the access network (CU-UP) based on information included in the first service operation.

In an embodiment, the processor may execute the program to further perform transmitting user equipment (UE) related information to the AMF before receiving the request for the first service operation from the AMF.

In an embodiment, the request of the first service operation may include a first uplink (UL) tunnel endpoint ID (TEID) and a QoS flow identifier (QFI) parameter to be used by the CU-UP.

In an embodiment, when establishing the bearer associated with the user plane function (CU-UP), the processor may perform: requesting a second service operation for establishing the bearer to the CU-UP through a second interface of the service-based architecture between the network function and the CU-UP; and receiving a response corresponding to the request of the second service operation from the CU-UP, and the second service operation may include the first UL TEID and the QFI parameter.

In an embodiment, the response corresponding to the request of the second service operation may include a first downlink (DL) TEID to be used by the AMF and a second UL TEID to be used by a digital unit (DU) of the access network.

In an embodiment, the processor may execute the program to further perform: requesting a third service operation for UE context setup to the DU through a third interface of the service-based architecture between the DU and the network function; and receiving a response corresponding to the request of the third service operation from the DU through the third interface.

In an embodiment, the request of the third service operation may include the second UL TEID and the response corresponding to the request of the third service operation may include a second DL TEID to be used by the CU-UP.

In an embodiment, the processor may execute the program to further perform: requesting a fourth service operation for modification of a bearer context of the bearer to the CU-UP through the second interface; and receiving a response corresponding to the request of the fourth service operation from the CU-UP.

In an embodiment, the request of the fourth service operation may include the second DL TEID.

In an embodiment, the processor may execute the program to further perform transmitting a response corresponding to the request of the first service operation to the AMF, and the response corresponding to the request of the first service operation may include the first DL TEID.

According to another embodiment, a method for supporting an access of user equipment (UE) by a network function is provided. The method includes: receiving a request for a first service operation for initial context setup from an access and mobility management function (AMF) of a core network through a first interface of a service-based architecture between the AMF and the network function; and establishing a bearer associated with a user plane function within the access network (CU-UP) based on information included in the first service operation.

In an embodiment, the method may further include transmitting user equipment (UE) related information to the AMF before receiving the request for the first service operation from the AMF.

In an embodiment, the request of the first service operation may include a first uplink (UL) tunnel endpoint ID (TEID) and a QoS flow identifier (QFI) parameter to be used by the CU-UP.

In an embodiment, the establishing the bearer associated with the user plane function (CU-UP) may include: requesting a second service operation for establishing the bearer to the CU-UP through a second interface of the service-based architecture between the network function and the CU-UP; and receiving a response corresponding to the request of the second service operation from the CU-UP, and the second service operation may include the first UL TEID and the QFI parameter.

In an embodiment, the response corresponding to the request of the second service operation may include a first downlink (DL) TEID to be used by the AMF and a second UL TEID to be used by a digital unit (DU) of the access network.

In an embodiment, the method may further include requesting a third service operation for UE context setup to the DU through a third interface of the service-based architecture between the DU and the network function; and receiving a response corresponding to the request of the third service operation from the DU through the third interface.

In an embodiment, the request of the third service operation may include the second UL TEID and the response corresponding to the request of the third service operation may include a second DL TEID to be used by the CU-UP.

In an embodiment, the method may further include requesting a fourth service operation for modification of a bearer context of the bearer to the CU-UP through the second interface; and receiving a response corresponding to the request of the fourth service operation from the CU-UP.

In an embodiment, the request of the fourth service operation may include the second DL TEID.

In an embodiment, the method may further include transmitting a response corresponding to the request of the first service operation to the AMF, and the response corresponding to the request of the first service operation may include the first DL TEID.

In an embodiment, the network function or the CU-UP may be configured to register or discover a service that each provides through an access network repository function (ANRF) in the access network.

DETAILED DESCRIPTION OF THE EMBODIMENTS

Figure 1:
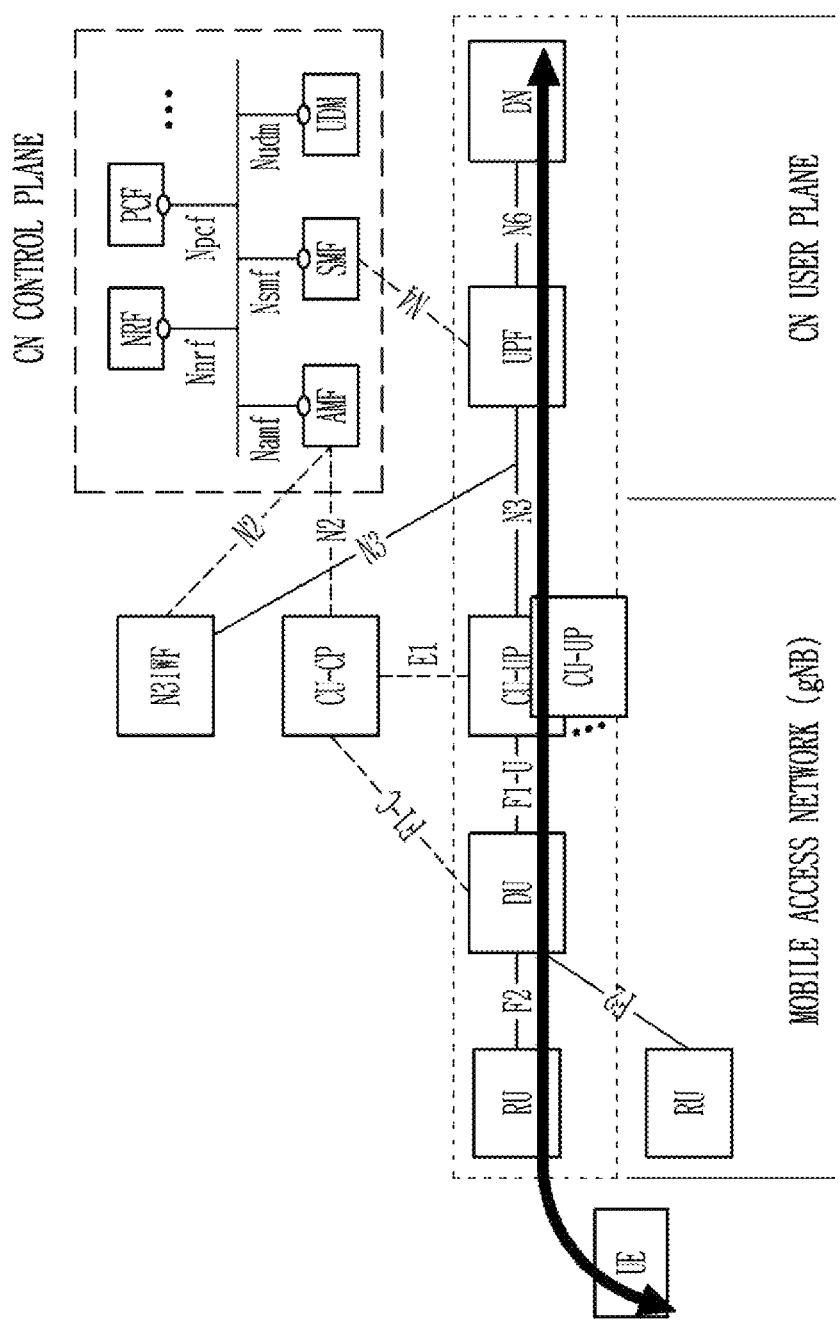
FIG. 1 is a diagram illustrating a 5G system architecture including P2P access network according to an embodiment.

In the following detailed description, only certain embodiments of the present disclosure have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the gNodeB (gNB) may be called a base station (BS), an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B,s the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

As used herein, "A or B", "at least one of A and B", "at least one of A or B", "A, B, or C", "at least one of A, B, and C", and "at least one of A, B, or C" each may include any one of, or all possible combinations of, items listed together in the corresponding one of the phrases.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a diagram illustrating a 5G system architecture including P2P access network according to an embodiment.

Referring to FIG. 1, a 5G system according to an embodiment may include a 5G core network (CN) and a radio access network (RAN). In the 5G system, the CN and the RAN may be composed of a control plane (CP) and a user plane (UP). The CP of the 5G CN may operate based on a service-based architecture (SBA).

In FIG. 1, an N4 interface is an interface for traffic control of the 5G CN and may be included in the SBA of the CP of the 5G CN. In the SBA applied to the CP of the 5G CN, interaction between NFs (e.g., service registration, service discovery), service request/response, and service subscription/notification may be configured with an application programming interface (API). A network repository function (NRF) is an NF for interaction between the NFs.

Referring to FIG. 1, a central unit (CU) of the RAN includes CU-CP (Central Unit-Control Plane) and CU-UP (Central Unit-User Plane). The CU-CP and the CU-UP can be connected through an E1 interface. The CU-CP and a data unit (DU) can be connected through an F1-C interface. The CU-CP and an access and mobility management function (AMF) can be connected through an N2 interface. In FIG. 1, the interfaces for signaling with the CU-CP are a peer-to-peer (P2P) interface.

In an embodiment, initial access of user equipment (UE) may be performed through the E1 interface and the F1 interface included in the RAN.

CP-related interfaces of the core network of the 5G system are implemented by the SBA, but the interfaces such as N2, E1, and F1-C of the access network have the P2P structure. Therefore, when NFs implemented as software are virtualized and disposed to a cloud, flexibility may be reduced and a lot of CAPEX and OPEX may be required by added functions for new services.

Below, embodiments in which the SBA is applied to the access network of a mobile communication system will be described. Since signaling associated with the CP of the access network of the mobile communication system is implemented by the SBA, RAN virtualization and modularization can be provided more flexibly and CAPEX and OPEX can be reduced when new NFs are added to the access network.

Figure 2:
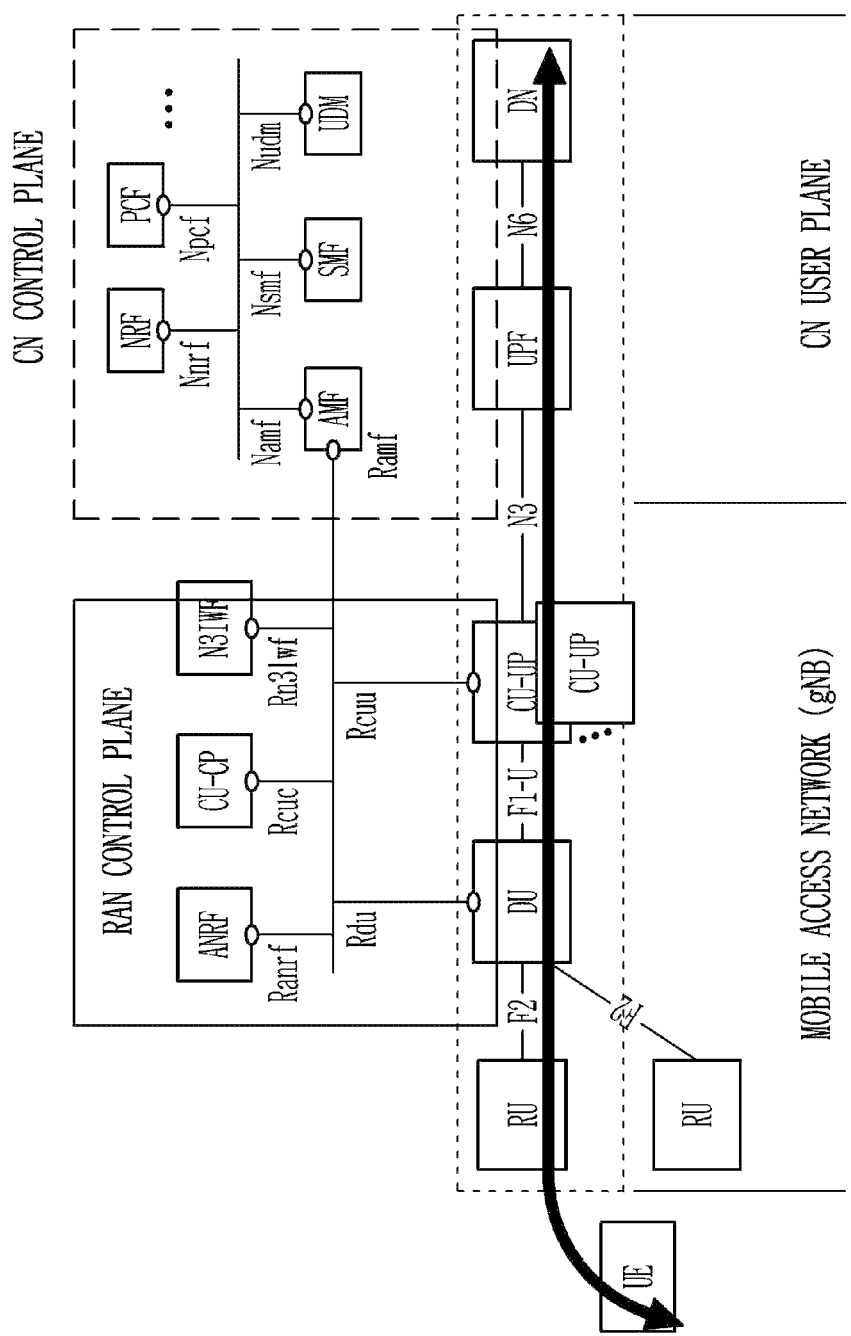
FIG. 2 is a diagram illustrating a mobile communication system including an SBA-based access network according to an embodiment.

FIG. 2 is a diagram illustrating a mobile communication system including an SBA-based access network according to an embodiment.

In order to implement the CP of the access network of the mobile network with the SBA, service operations provided by each NF in the access network and parameters required to perform the service operations may be defined. In addition, an access network repository function (ANRF) added in the SBA of the access network may provide service registration and discovery of NFs included in the access network, so a more flexible and efficient access network architecture for the RAN virtualization can be provided.

Referring to FIG. 2, interfaces between the NFs of the access network (N2, F1, E1, etc.) may be provided with the SBA rather than the P2P interface of FIG. 1. That is, since the CP of the RAN is provided with the SBA, the NFs in the RAN may communicate with other NFs through the SBI.

Referring to FIG. 2, the ANRF, the CU-CP, and an N3IWF (Non-3GPP Interworking Function) included in the CP of the access network may be connected to the AMF of the core network through an Ramf interface.

In addition, each NF in the CP of the access network may be connected to a user plane function of the access network (CU-UP) through an Rcuu interface and may be connected to the DU through an Rdu interface.

In an embodiment, each NF in the CP of the access network may provide service operations so that other NFs can use the service provided by each NF and parameters necessary for the service operation may be defined in each NF. In addition, the ANRF may provide registration and discovery of services provided by each NF in the SBA of the access network. Some or all functions of the ANRF may be included in the CU-CP.

Conventionally, the AMF of the core network has performed one-to-one communication with the CU-CP of the access network through the N2 interface, but in the SBA structure according to an embodiment, the AMF may provide a network service through the Ramf interface and AMF may use an access network service through the Rcuc, Rcuu, Rn3iwf interfaces. In addition, the NFs in the access network may directly receive necessary NF services among other NF services registered in the ANRF.

Figure 3:
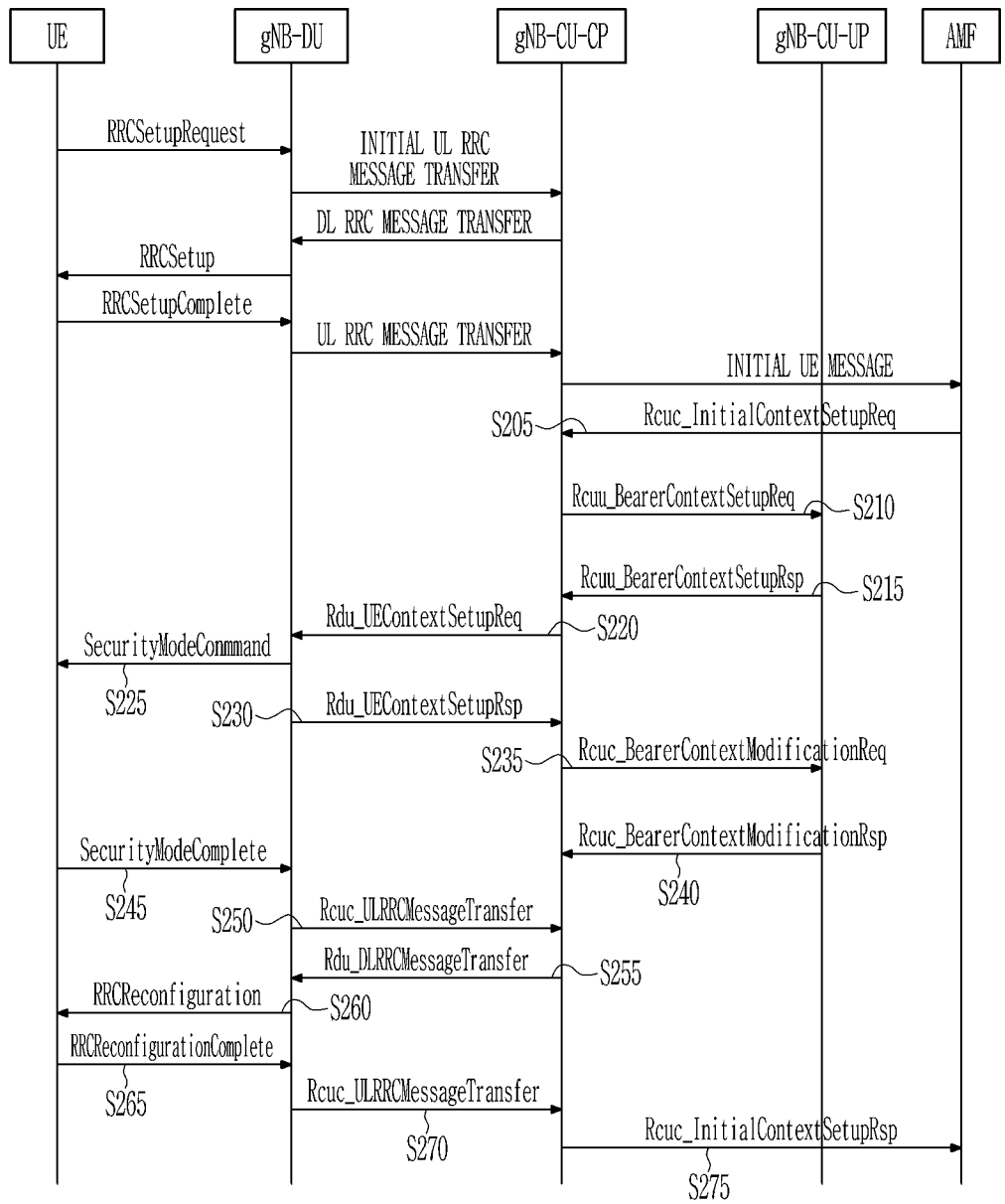
FIG. 3 is a flowchart illustrating a method for supporting initial access of UE in an SBA-based access network structure according to an embodiment.

FIG. 3 is a flowchart illustrating a method for supporting initial access of UE in an SBA-based access network structure according to an embodiment.

In the SBA-based access network, each NF may provide a service and various service operations for the service to be provided may be defined in each NF. In FIG. 3, an initial context setup procedure performed mainly on the CU-CP and the names of operations necessary for the initial context setup are arbitrarily described below.

Referring to FIG. 3, the UE may initiate initial access by sending an RRC setup request (RRCSetupRequest message) to the gNB (i.e., gNB-DU). The gNB-DU may transfer an uplink RRC message (INITIAL UL RRC MESSAGE TRANSFER) to the gNB-CU-CP and receive an RRC message including information for the initial access of the UE from the gNB-CU-CP (DL RRC MESSAGE TRANSFER). The gNB-DU may transmit an RRC message including the information for the initial access to the UE (RRCSetup) and the UE may inform the gNB of RRC setup completion (RRCSetupComplete).

When the RRC connection setup between the UE and the mobile access system is completed, the gNB-DU may transmit UE-related information to the AMF via the gNB-CU-CP (UL RRC MESSAGE TRANSFER and INITIAL UE MESSAGE).

The AMF may request a service to the gNB-CU-CP through Rcuc_InitialContextSetup Req. service operation (S205). Rcuc_InitialContextSetup Req. service operation may include an uplink (UL) Tunnel Endpoint ID (TEID) of the N3 interface (an interface between the CU-UP and user plane function (UPF)) and a QFI (QoS Flow identifier) parameter required to generate an RB (Radio Bearer).

Upon receiving the service request, the gNB-CU-CP may establish a bearer by performing a service request and response with the CU-UP through Rcuu_BearerContextSetup Req/Rsp service operation (S210 and S215). The CU-CP may transmit the N3 UL TEID and the QFI parameter received from the AMF to the gNB-CU-UP through a bearer context establishment request and the gNB-CU-UP may transmit an N3 DL TEID and an F1-U UL TEID to the gNB-CU-CP through a response service operation corresponding to the request.

The gNB-CU-CP may use services of the gNB-DU using the Rdu_UEContextSetup Req/Rsp service operation (S220 and S230). The gNB-CU-CP may transmit the F1-U UL TEID to the gNB-DU through UE context setup request and the gNB-DU may transmit an F1-U DL TEID to the gNB-CU-CP through a service response.

The gNB-DU may inform the UE that the UE has been authenticated by the mobile network using the SecurityModeCommand message (S225).

Afterwards, the UE may use a SecurityModeComplete message to complete integrity verification (S245).

The gNB-CU-CP may perform a service request and response for modifying a bearer context with the CU-UP through Rcuu_BearerContextModification Req/Rsp service operation (S235 and S240). The gNB-CU-CP may transmit the F1-U DL TEID received from the DU to the gNB-CU-UP.

The gNB-CU-CP may establish a wireless connection with the UE using Rdu_RRCMessageTransfer and Rcuc_RRCMessageTransfer service operations (S250, S255, S260, S265, and S270), and then respond to the AMF through the Rcuc_InitialContextSetup Rsp service operation (S275). The gNB-CU-CP may transmit the N3 DL TEID received from the gNB-CU-UP to the AMF.

Since the signaling associated with the CP of the access network of the mobile communication system described above is transmitted by the SBA, the RAN virtualization and modularization can be provided more flexibly and the CAPEX and OPEX can be reduced when a new NF is added to the access network.

Figure 4:
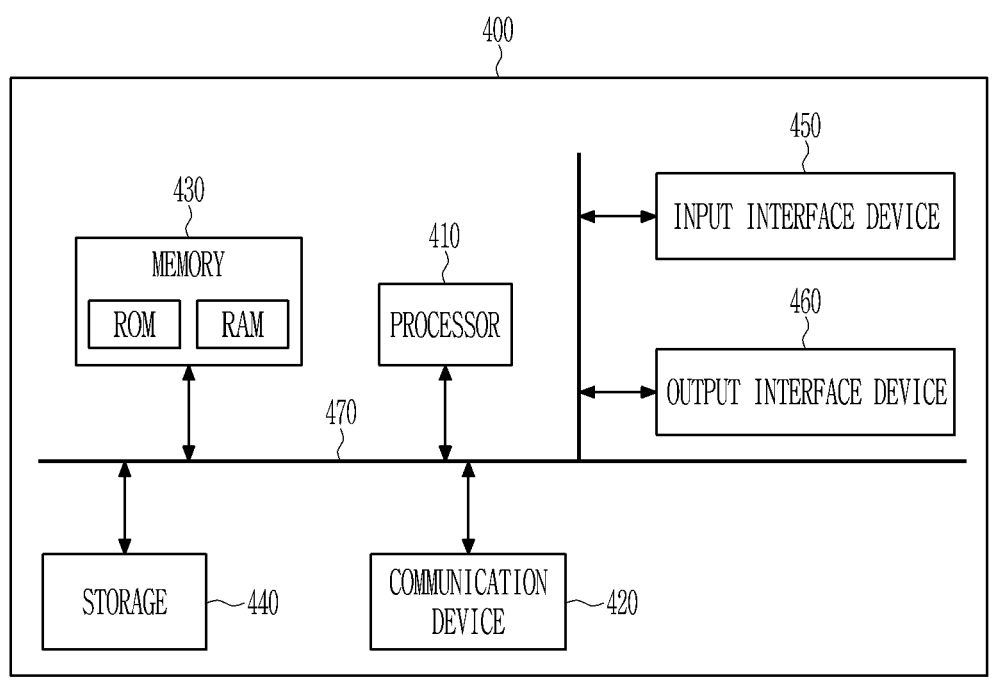
FIG. 4 is a block diagram illustrating NF according to an embodiment.

FIG. 4 is a block diagram illustrating an NF according to an embodiment.

The NF according to embodiments may be implemented as a computer system, for example, a computer-readable medium. Referring to FIG. 4, the computer system 400 may include at least one of a processor 410, a memory 430, an input interface device 450, an output interface device 460, and a storage device 440 communicating through a bus 470. The computer system 400 may also include a communication device 420 coupled to the network. The processor 410 may be a central processing unit (CPU) or a semiconductor device that executes instructions stored in the memory 430 or the storage device 440. The memory 430 and the storage device 440 may include various forms of volatile or nonvolatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

According to an exemplary embodiment of the present disclosure, the computer system 400 may include a processor (e.g., computer, microprocessor, CPU, ASIC, circuitry, logic circuits, etc.) and an associated non-transitory memory storing software instructions which, when executed by the processor, provides the functionalities of the processor 410, the communication device 420, the input interface device 450 and the output interface device 460. Herein, the memory and the processor may be implemented as separate semiconductor circuits. Alternatively, the memory and the processor may be implemented as a single integrated semiconductor circuit. The processor may embody one or more processor(s).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 420 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD- ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any disclosure or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A network function in an access network, comprising:
a processor and memory, wherein the processor executes a program stored in the memory to perform:
receiving a request for a first service operation for initial context setup, which is a Rcuc_InitialContextSetup_Req service operation that includes a first uplink (UL) tunnel endpoint ID (TEID) and a QoS flow identifier (QFI) parameter, from an access and mobility management function (AMF) of a core network through a service-based interface between the AMF and the network function;
requesting a second service operation, which is a Rcuu_BearerContextSetup_Req service operation that includes the UL TEID and the QFI received from AMF for establishing a bearer to a user plane function (CU-UP) through a service-based interface between the network function and the CU-UP; and
receiving a response corresponding to the request of the second service operation.

2. The network function of claim 1, wherein the processor executes the program to further perform transmitting user equipment (UE) related information to the AMF before receiving the request for the first service operation from the AMF.

3. The network function of claim 1, wherein the response corresponding to the request of the second service operation includes a first downlink (DL) TEID to be used by the AMF and a second UL TEID to be used by a data unit (DU) of the access network.

4. The network function of claim 3, wherein the processor executes the program to further perform:
requesting a third service operation for UE context setup to the DU through a service-based interface between the DU and the network function; and
receiving a response corresponding to the request of the third service operation from the DU through the service-based interface.

5. The network function of claim 4, wherein the request of the third service operation includes the second UL TEID and the response corresponding to the request of the third service operation includes a second DL TEID to be used by the CU-UP.

6. The network function of claim 5, wherein the processor executes the program to further perform:
requesting a fourth service operation for modification of a bearer context of the bearer to the CU-UP through a service-based interface; and
receiving a response corresponding to the request of the fourth service operation from the CU-UP.

7. The network function of claim 6, wherein the request of the fourth service operation includes the second DL TEID.

8. The network function of claim 3, wherein:
the processor executes the program to further perform transmitting a response corresponding to the request of the first service operation to the AMF, and
the response corresponding to the request of the first service operation includes the first DL TEID.

9. A method for supporting an access of user equipment (UE) by a network function, the method comprising:
receiving a request for a first service operation for initial context setup, which is a Rcuc_InitialContextSetup_Req service operation that includes a first uplink (UL) tunnel endpoint ID (TEID) and a QoS flow identifier (QFI) parameter, from an access and mobility management function (AMF) of a core network through a service-based interface between the AMF and the network function;

requesting a second service operation, which is a Rcuu_BearerContextSetup_Req service operation that includes the UL TEID and the QFI received from AMF for establishing a bearer to a user plane function (CU-UP) through a service-based interface between the network function and the CU-UP; and receiving a response corresponding to the request of the second service operation.

10. The method of claim 9, further comprising transmitting user equipment (UE) related information to the AMF before receiving the request for the first service operation from the AMF.

11. The method of claim 9, wherein the response corresponding to the request of the second service operation includes a first downlink (DL) TEID to be used by the AMF and a second UL TEID to be used by a data unit (DU) of the access network.

12. The method of claim 11, further comprising:

requesting a third service operation for UE context setup to the DU through a service-based interface between the DU and the network function; and receiving a response corresponding to the request of the third service operation from the DU through the service-based interface.

13. The method of claim 12, wherein the request of the third service operation includes the second UL TEID and the response corresponding to the request of the third service operation includes a second DL TEID to be used by the CU-UP.

14. The method of claim 13, further comprising:

requesting a fourth service operation for modification of a bearer context of the bearer to the CU-UP through a service-based interface; and receiving a response corresponding to the request of the fourth service operation from the CU-UP.

15. The method of claim 14, wherein the request of the fourth service operation includes the second DL TEID.

16. The method of claim 9, wherein the network function or the CU-UP registers or discovers a service that each provides through an access network repository function (ANRF) in the access network.

* * * * *